United States Patent
Kim et al.

(10) Patent No.: US 8,565,042 B2
(45) Date of Patent: Oct. 22, 2013

(54) SYSTEM AND METHOD FOR REDUCING DATA RECEPTION ERROR IN ACOUSTIC COMMUNICATION IN AUDIBLE FREQUENCY RANGE, AND APPARATUS APPLIED THERETO

(75) Inventors: Dong Keon Kim, Seoul (KR); Moon Kee Kim, Yongin-si (KR); Keun Hwan Choi, Seoul (KR); Jae Hwang Yu, Seoul (KR); Min Seok Kim, Seoul (KR); Nam Soo Kim, Seoul (KR); Hwan Sik Yun, Seoul (KR); Ki Ho Cho, Gunpo-si (KR)

(73) Assignees: SK Telecom Co., Ltd, Seoul (KR); SNU R&DB Foundation, Seoul (KR)

( * ) Notice: Subject to any disclaimer, the term of this patent is extended or adjusted under 35 U.S.C. 154(b) by 0 days.

(21) Appl. No.: 13/529,611

(22) Filed: Jun. 21, 2012

(65) Prior Publication Data

US 2012/0269038 A1     Oct. 25, 2012

Related U.S. Application Data

(63) Continuation of application No. PCT/KR2010/004955, filed on Jul. 28, 2010.

(30) Foreign Application Priority Data

Dec. 21, 2009   (KR) .......................... 10-2009-0128146

(51) Int. Cl.
*H04B 1/00* (2006.01)
(52) U.S. Cl.
USPC ....................................................... 367/135
(58) Field of Classification Search
USPC ............................................... 367/135, 134
See application file for complete search history.

(56) References Cited

U.S. PATENT DOCUMENTS

2005/0102048 A1    5/2005  Anderson et al.
2012/0269038 A1*  10/2012  Kim et al. .................... 367/135

FOREIGN PATENT DOCUMENTS

| EP | 0265097 | 4/1988 |
| JP | 2004-129297 | 4/2004 |
| KR | 10-2000-0022748 | 4/2000 |

OTHER PUBLICATIONS

Gi-Ho Cho; "Data Hiding in Audio Signal for Audible Frequency Band Acoustic Communication"; Seoul University Graduate School; Electric Computer Engineering Department; 2007-21093; 12 pages.
Korean Office Action for 10-2009-0128146 dated May 22, 2012.
International Search Report mailed Apr. 28, 2011 for PCT/KR2010/004955.

\* cited by examiner

*Primary Examiner* — Daniel Pihulic
(74) *Attorney, Agent, or Firm* — Lowe Hauptman & Ham, LLP

(57) ABSTRACT

Provided is a data reception error reduction system and method in acoustic communication in audible frequency range, and an apparatus applied thereto. The data reception error reduction system in the acoustic communication in audible frequency range may be configured to reduce a data reception error in a receiver by taking into consideration that a sound signal is noisy and is significantly affected by a change in the ambient environment when the acoustic communication is performed in the audio frequency band through modification of an audio signal or adding of a predetermined signal to an audio signal. Accordingly, the data reception error may be reduced in the receiver even in an environment where a sound signal is noisy and is significantly affected by a change in the ambient environment, and reliability of data transmission may increase.

13 Claims, 6 Drawing Sheets

US 8,565,042 B2

SYSTEM AND METHOD FOR REDUCING DATA RECEPTION ERROR IN ACOUSTIC COMMUNICATION IN AUDIBLE FREQUENCY RANGE, AND APPARATUS APPLIED THERETO

CROSS REFERENCE TO RELATED APPLICATION

Related Applications

The present application is a continuation of International Application Number PCT/KR2010/004955 filed Jul. 28, 2010, the disclosure of which is hereby incorporated by reference herein in their entirety. Further, this application claims the priority of Korean Patent Application No. 10-2009-0128146, filed on Dec. 21, 2009 in the KIPO (Korean Intellectual Property Office), the disclosure of which are incorporated herein in their entirety by reference.

TECHNICAL FIELD

The present invention relates to acoustic communication in audible frequency range, and more particularly, to a data reception error reduction system and method in acoustic communication in audible frequency range, and an apparatus applied thereto, which reduces a data reception error in a receiver while the acoustic communication is performed in the audible frequency range through modification of an audio signal or adding of a predetermined signal to an audio signal.

BACKGROUND ART

It has been developed that cuts off an audio signal with respect to a predetermined frequency band using a digital filter and inserts, with respect to the predetermined frequency band, an orthogonal frequency division multiplexing (OFDM) signal commonly used for wireless communication, or changes a phase in the frequency-dimension through a modified complex lapped transform (MCLT) for acoustic communication.

Above measures are to insert a signal into audio signal that may not be recognized by a human, so as to maintain the utility of an audio signal and enable acoustic communication.

However, conventional acoustic communication may have deterioration of performance due to ambient noise or a characteristic associated with transmission via air and thus, the conventional acoustic communication may have difficulty in performing reliable transmission of information. Particularly, when a single subcarrier is used for transmitting single data in the acoustic communication that is significantly affected by a change in ambient environment, the bit error rate (BER) of data increases and communication performance may not be guaranteed.

DISCLOSURE

Technical Problem

Therefore, in view of the above-mentioned problems, an aspect of the present invention is to provide a data reception error reduction system and method in acoustic communication in audible frequency range, and an apparatus applied thereto, which reduces a data reception error in a receiver by taking into consideration that a sound signal is noisy and is significantly affected by a change in ambient environment when the acoustic communication is performed in the audible frequency range through modification of an audio signal or adding of a predetermined signal to an audio signal.

Another aspect of the present invention is to provide a data reception error reduction system and method in acoustic communication in audible frequency range, and an apparatus applied thereto, which applies a bit determining appropriate for the acoustic communication when a receiver extracts a data signal from an audio signal in the acoustic communication in audible frequency range and thus, an error of a data bit may be reduced and reliability of data transmission may increase.

Technical Solution

In accordance with an aspect of the present invention, there is provided a system for reducing a data reception error in acoustic communication, comprising: a transmitter for acoustically transmitting audio signals, which contains synchronization signals and bit-wise data signals in frequency domain; and a receiver for receiving the audio signal transmitted acoustically, transforming thereof into frequency domain, detecting the synchronization signals and detecting the data signals with a reference to the position of the detected synchronization signals, and collectively determining the bits of the data signals based on clusters of the data signals formed in I-Q complex frequency domain.

In accordance with an aspect of the present invention, there is provided a receiver for reducing a data reception error in acoustic communication in audible frequency range, the receiver comprising: a transforming unit configured to transform an audio signal received using the acoustic communication in audible frequency range into a frequency-domain signal based on a predetermined transform; a first detecting unit configured to perform a correlation operation so as to detect a synchronization signal included in the frequency-domain signal; a second detecting unit configured to detect the data signal included in the frequency-domain signal based on the location of the synchronization signal; a bit determining unit configured to represent the data signal in complex plane, to form clusters for the data signals within a predetermined range, and to determine a bit for each of the clusters for determining the bit of the data signals associated with each of the clusters; and an extracting unit configured to extract data associated with the data signal.

The first detecting unit may perform MCLT on each sample frame of the audio signal, perform the correlation operation so as to generate a correlation value, and determine a location of the synchronization signal based on the location of a peak of the correlation value.

In accordance with an aspect of the present invention, there is provided a method of reducing a data reception error in acoustic communication in audible frequency range, the method comprising: transforming an audio signal received using acoustic communication in audible frequency range into a frequency-domain signal based on a predetermined transform ; performing a correlation operation so as to detect a synchronization signal included in the frequency-domain signal; detecting the data signal included in the frequency-domain signal based on the location of the synchronization signal; representing the data signal in complex plane, forming clusters for the data signals within a predetermined range, and determining a bit for each of the clusters for determining the bit of the data signals associated with each of the clusters; and extracting data associated with the data signal.

Advantageous Effects

Therefore, the present invention applies a bit determining appropriate for acoustic communication when a receiver extracts a data signal from an audio signal in acoustic communication in audible frequency range and thus, may reduce a data reception error even in an environment where a sound signal is noisy and is significantly affected by a change in the ambient environment and may increase reliability of data transmission, while the acoustic communication is performed in the audible frequency range through modification of an audio signal or adding of a predetermined signal to an audio signal.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described with reference to the attached drawings.

Figure 1:
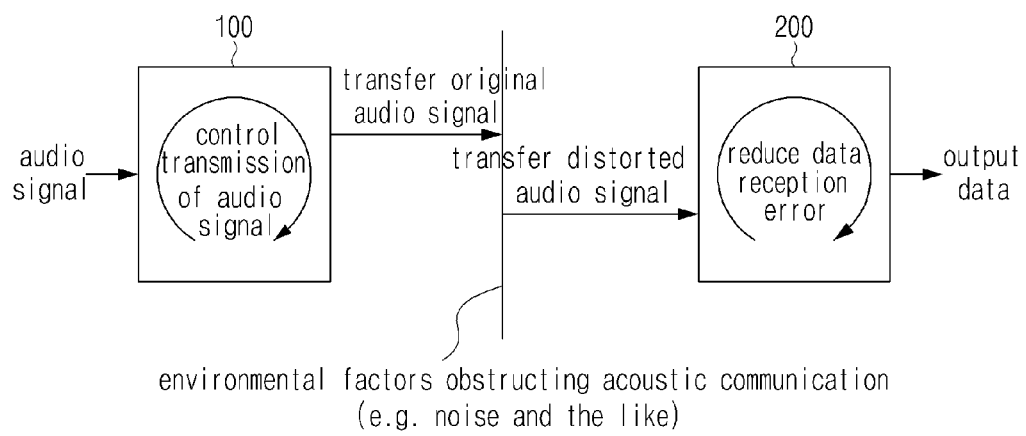
FIG. 1 is a diagram illustrating a data reception error reduction system in acoustic communication in audible frequency range according to an embodiment of the present invention.

FIG. 1 illustrates a data reception error reduction system in acoustic communication in audible frequency range according to an embodiment of the present invention.

As illustrated in FIG. 1, the system may include a transmitter 100 to transmit an audio signal based on acoustic communication in audible frequency range, and a receiver 200 to receive an audio signal from the transmitter 100, to extract a data signal included in the received audio signal, and to read extracted data. Here, the acoustic communication in audible frequency range refers to communication that transmits an audio signal after modulating the audio signal or adding a predetermined signal to the audio signal, and enables the receiver 200 that receives the audio signal to extract data included in the audio signal. In addition, in the acoustic communication, a device that plays back an audio signal such as a speaker and the like may be defined to be the transmitter 100, and a device that transforms a sound signal in a space into an electric signal, such as a microphone and the like, may be defined to be the receiver 200.

For reference, in a acoustic communication system, a communication signal may be transmitted by the transmitter 100 and may be received by the receiver 200. However, given a characteristic of the sound signal, the sound signal is significantly affected by a change in the ambient environment and thus, an error rate of data transmission based on a conventional may increase. In electromagnetic wave-based communication, a reception error may occur due to an effect caused by a communication channel. Accordingly, in general, a channel equalizer may be employed to offset a channel effect and to determine data, so as to prevent the reception error. However, in acoustic communication, a characteristic of a sound wave transmitted via a space varies based on the ambient environment and thus, it may be difficult to employ the channel equalizer. Accordingly, a general detecting that performs channel compensation through use of an equalizer and determines a bit to be '0' or '1' based on a sign of a real number may be inappropriate for acoustic communication.

Therefore, the present invention may apply a new bit determining that reduces a data reception error in acoustic communication. To help understanding of the bit determining, a sound code system will be described. The sound code system may insert digital data into an analog audio signal through use of a binary phase shift key (BPSK). However, the sound code system may not guarantee reliability of communication since transmission performance significantly varies based on the degree of noise in the ambient environment, or performance of a speaker, a microphone, and the like. Also, unless the transmitter 100 and the receiver 200 are located close to each other, and face each other, it may occur frequently that data inserted into the audio signal is broken due to a change in the phase of a sound signal. Accordingly, a signal that is received and decoded by the receiver 200 may be significantly different from an originally transmitted signal. In addition, a process of determining a digital bit of a signal received by the receiver 200 may also have difficulty in adopting a conventional digital bit determining. In a conventional communication system, compensation associated with a difference in delay times of channels may be performed through use of an equalizer and then, a synchronization process may be performed. Also, for a non-integer delay, the conventional communication may represent a recognized signal on an I-Q plot and may perform adjusting by a corresponding phase based on a phase shift key (PSK) so as to perform synchronization. Through the described processes, a BPSK signal may be represented as a point at '0' or 'Π' on the I-Q plot, and a bit of '0' or '1' may be determined based on '0' or 'Π'. However, it may be difficult for the acoustic communication system to employ a general bit determining algorithm since a phase varies based on the location, direction, or the state of the transmitter 100 and the receiver 200. Particularly, when the distance between the transmitter 100 and the receiver 200 is greater than a predetermined range or when a sound signal is received by the receiver 200 after passing by an obstacle, a phase delay more than Π/2 may occur and thus, it is difficult to determine a bit may frequently.

To overcome the drawbacks, the receiver 200 may transform an audio signal based on the acoustic communication in audible frequency range into a frequency-domain signal based on a predetermined transform, and may perform a correlation operation to detect a synchronization signal from among the synchronization signal and a data signal included in the frequency-domain signal. In particular, the receiver 200 may perform modified complex lapped transform (MCLT) on each sample frame of the audio signal which is transformed into the frequency-domain signal, may perform the correlation operation so as to generate a correlation value, and may determine a synchronization location based on the location of a peak of the correlation value.

Also, the receiver 200 may detect the data signal based on the location of the detected synchronization signal, may represent the detected data signal in complex plane, may form clusters for the data signals according to a predetermined range, and may determine a bit for each of the clusters for determining the bit of the data signals associated with each of the clusters.

In particular, the receiver 200 may obtain an initial bit value from a pilot signal in advance, and may perform calculation associated with a phase delay of the data signal so as to generate a mapping reference value. The receiver 200 may perform mapping the data signal based on the mapping reference value, and may update the mapping reference value by reflecting a result of mapping the data signal on the mapping reference value. In addition, the receiver 200 may adjust a range of the clusters by reflecting the result of mapping associated with the data signal.

Also, the receiver 200 may extract data associated with the data signal.

Figure 2:
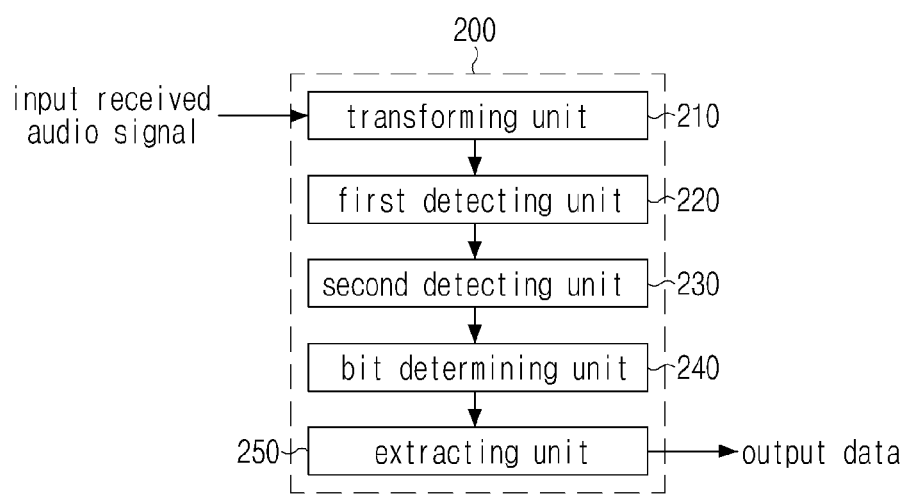
FIG. 2 is a diagram illustrating a receiver according to an embodiment of the present invention.

Hereinafter, a configuration of the receiver 200 will be described in detail with reference to FIG. 2.

That is, for effectively determining a bit in acoustic communication, the receiver 200 may include a transforming unit 210 to transform an audio signal into a frequency-domain signal, a first detecting unit 220 to perform a correlation operation to detect a synchronization signal, a second detecting unit 230 to detect a data signal, a bit determining unit 240 to determine a bit associated with a data signal, and an extracting unit 250 to extract data.

The transforming unit 210 may receive an audio signal from the transmitter 100 based on acoustic communication in audible frequency range, and may transform the received audio signal into a frequency-domain signal based on a predetermined transform. In particular, to minimize deterioration of a synchronization signal and a data signal included in an audio signal, the synchronization signal and the data signal may be inserted with respect to a frequency-domain signal and thus, the transforming unit 210 may transform the received audio signal in time-domain into a frequency-domain signal.

The first detecting unit 220 may perform a correlation operation so as to detect a synchronization signal from among the synchronization signal and a data signal included in a frequency-domain signal that is obtained through the transform. In particular, the first detecting unit 220 may perform MCLT on each sample frame of the audio signal, may perform a correlation operation so as to generate a correlation value, and may determine a synchronization location based on the location of a peak of the correlation value. As another example, the first detecting unit 220 may perform MCLT on sample frames, each of which has predetermined intervals from adjacent frames, may perform a correlation operation so as to generate a correlation value, and may determine a synchronization location based on the location of a peak of the correlation value.

The second detecting unit 230 may detect a data signal based on the location of a detected synchronization signal. In particular, the second detecting unit 230 may be used for detecting a data signal, and may detect the data signal inserted with respect to a frequency domain, in the same manner as the method of detecting the synchronization signal. In this example, a value of the data signal may be determined based on the phase of an audio signal. However, the phase of the data signal detected by the second detecting unit 230 may vary based on the ambient environment and thus, may not be directly utilized for determining a bit of data.

Figure 3:
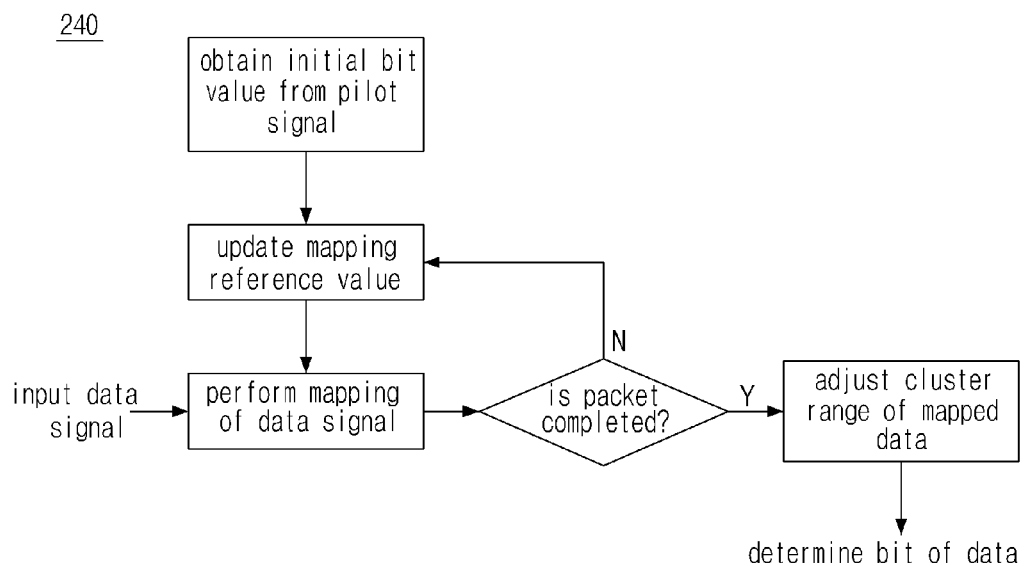
FIG. 3 is a flowchart illustrating a bit determining process in a receiver according to an embodiment of the present invention.

The bit determining unit 240 may represent a data signal in complex plane, may form clusters for the data signals according to a predetermined range, and may determine a bit for each of the clusters for determining the bit of the data signals associated with each of the clusters. In particular, the bit determining unit 240 may obtain an initial bit value from a pilot signal in advance, and may perform calculation associated with a phase delay of the data signal, as illustrated in FIG. 3. In this example, the pilot signal may be inserted along with a synchronization signal, and may be configured in a predetermined bit order according to a pilot data insertion rule and thus, a phase delay may be identified by referencing the pilot signal, in particularly and by comparing a transmitted pilot signal and a received pilot signal. Also, through use of a mapping reference value generated as a result of the calculation associated with the phase delay, the data signal extracted from the audio signal may be mapped. This process may relate to forming a cluster range based on a data concentration, and not to determine bit of data. Also, the bit determining unit 240 may perform mapping the provided data signal based on the mapping reference value, and may represent the data signal in complex plane. Accordingly, the bit determining unit 240 may update the mapping reference value by reflecting a result of mapping of the data signal, and may readjust a cluster range formed of based on data concentration of mapped data by reflecting the result of mapping of the data signal.

Figure 4:
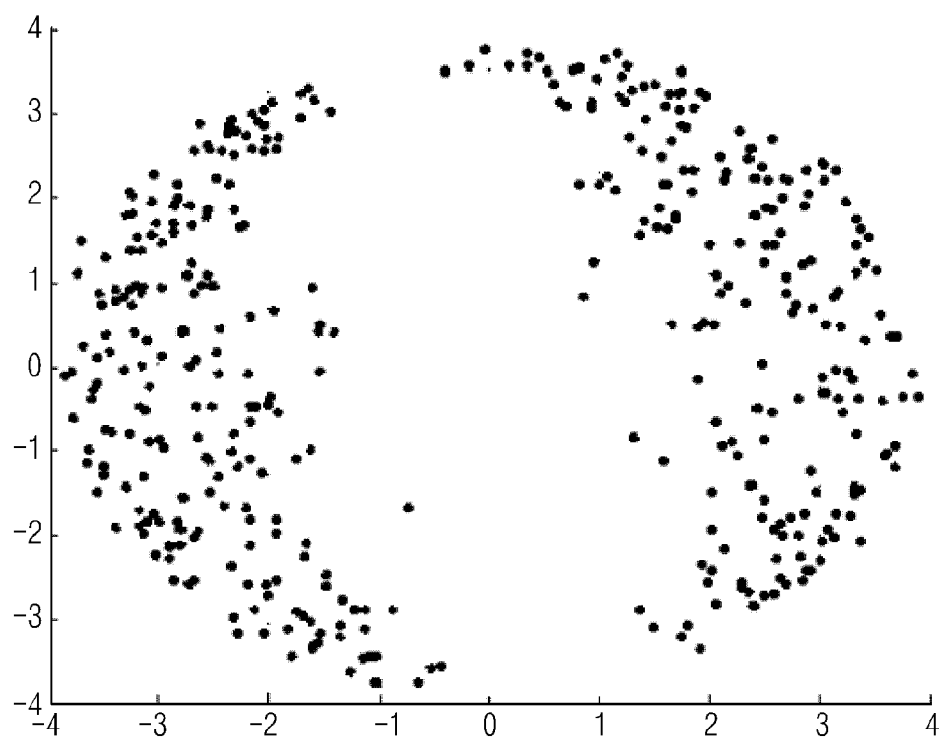
FIG. 4 is a diagram illustrating complex plane used when a receiver determines a bit according to an embodiment of the present invention.

FIG. 4 illustrates complex plane used for determining a bit in the bit determining unit 240 according to an embodiment of the present invention. The complex plane for determining a bit in the bit determining unit 240 may be shown as illustrated in FIG. 4. An acoustic communication system may have difficulty in employing an equalizer for compensation on behalf of modeling since the difference of time delay in each channel is not uniform. Accordingly, when a value received by the receiver 200 is represented on an I-Q plot, it may be spread as shown in FIG. 4 instead of concentration. Therefore, an embodiment of the present invention may determine a bit of data on the I-Q plot for each cluster after forming clusters based on a data concentration, as opposed to determining a bit based on a phase of '0' or 'n'.

The extracting unit 250 may extract data from a bit associated with the data signal.

As described in the foregoing, a data reception error reduction system in acoustic communication in audible frequency range may apply a bit determining appropriate for the acoustic communication when a receiver extracts a data signal from an audio signal and thus, may reduce a data reception error in the receiver even in an environment where a sound signal is noisy and is significantly affected by a change in the ambient environment and may increase reliability of data transmission, while the acoustic communication is performed in the audible frequency range through modification of an audio signal or inserting of a predetermined signal to an audio signal.

Hereinafter, a data reception error reduction method in acoustic communication in audible frequency range will be described with reference to FIGS. 5 and 6 according to an embodiment of the present invention.

Figure 5:
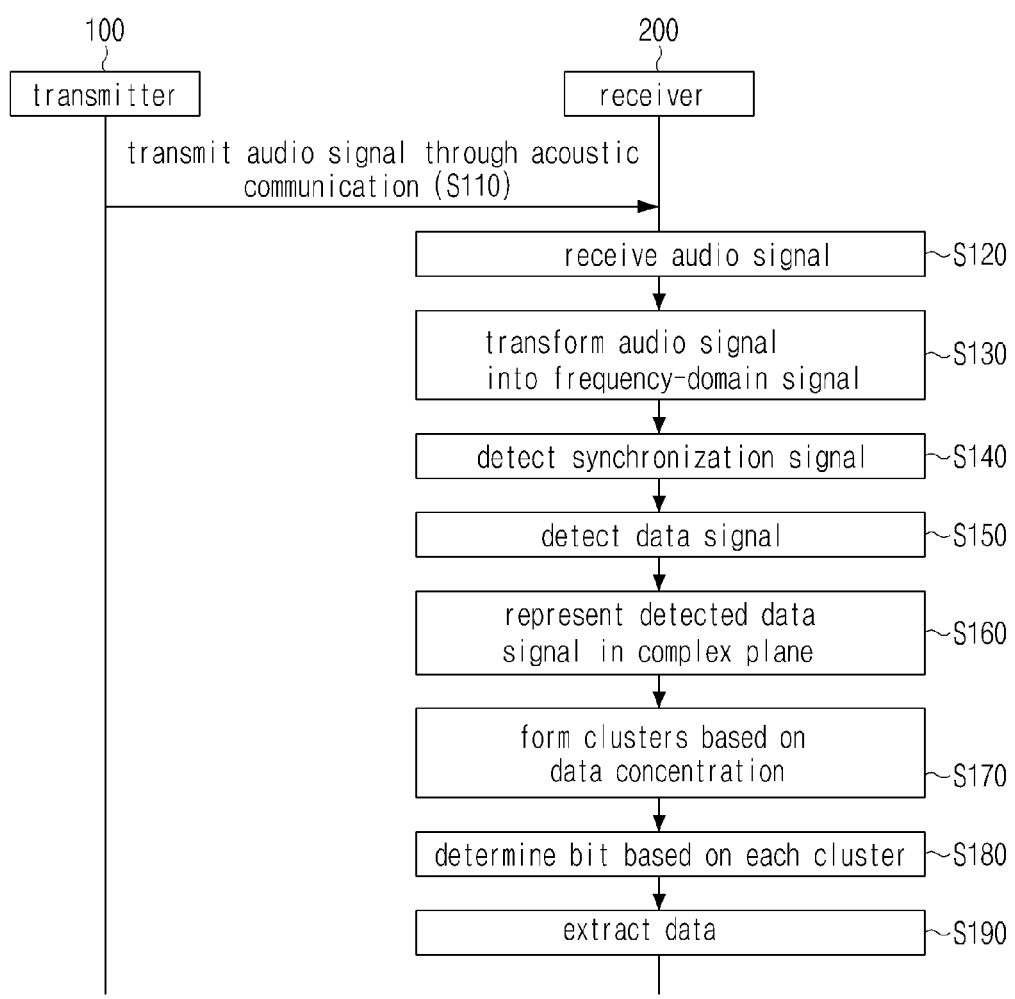
FIGS. 5 and 6 are flowcharts illustrating a data reception error reduction method in acoustic communication in audible frequency range.
Figure 6:
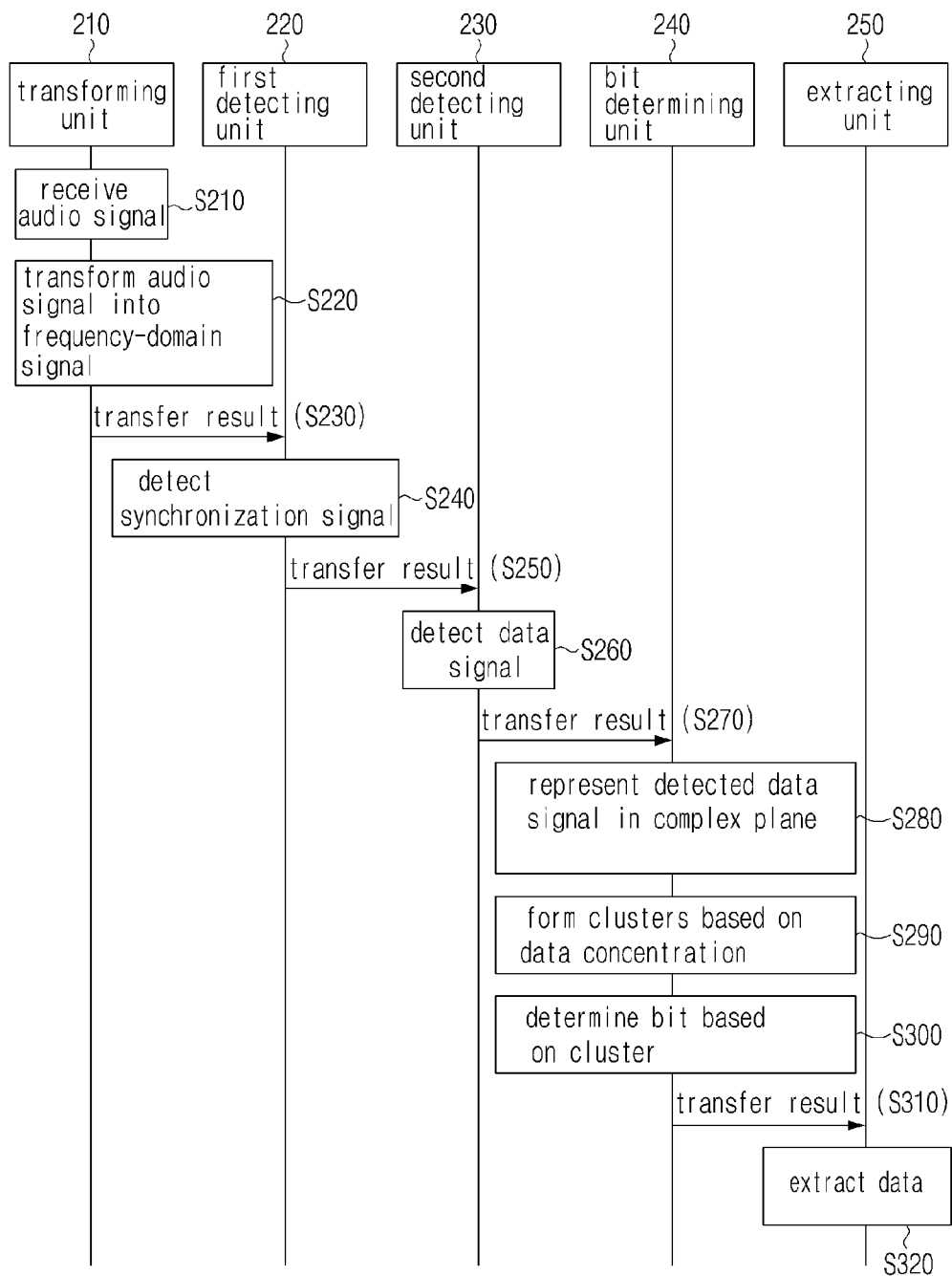

Referring to FIG. 5, a method of operating a data reception error reduction system in acoustic communication in audible frequency range will be described.

The data reception error reduction method in the acoustic communication in audible frequency range may transfer an audio signal from the transmitter 100 to the receiver 200 based on the acoustic communication in audible frequency range (step S110).

The receiver 200 may transform the received audio signal into a frequency-domain signal based on a predetermined transform (steps S120 and S130). To minimize deterioration of sound quality with respect to a synchronization signal and a data signal included in an audio signal, the synchronization signal and the data signal may be inserted into a frequency-domain signal and thus, the receiver 200 may transform the audio signal received from the transmitter 100 into a frequency-domain signal.

Subsequently, the receiver 200 may perform a correlation operation to detect the synchronization signal from among the synchronization signal and the data signal included in the frequency-domain signal that is obtained through the transform (step S140). The receiver 200 may perform MCLT on each sample frame of the audio signal, may perform a correlation operation so as to generate a correlation value, and may determine a synchronization location based on the location of a peak detected from the correlation value. The receiver 200 may detect the data signal based on the location of the detected synchronization signal (step S150). The receiver 200 may detect the data signal inserted into a frequency domain, in the same manner as the method of detecting the synchronization signal. In this example, a value of the data signal may be determined based on the phase of the audio signal.

The receiver 200 may represent the detected data signal in complex plane (step S160). The receiver 200 may obtain an initial bit value from a pilot signal in advance, and may perform calculation associated with a phase delay of the data signal based on the initial bit value so as to generate a mapping reference value. The receiver 200 may perform mapping of the data signal based on the mapping reference value. When data signal values of data signals in the complex plane form clusters within a predetermined range, a bit for each data signal may be determined based on a data concentration with respect to each of clusters (step S170).

The receiver 200 may extract corresponding data from the bit determined in step S170 (step S180). Hereinafter, a method of operating the receiver 200 to reduce a data reception error in acoustic communication in audible frequency range will be described with reference to FIG. 6 according to an embodiment of the present invention.

The receiver 200 may receive an audio signal from the transmitter 100 based on the acoustic communication in audible frequency range, and may transform the received audio signal into a frequency-domain signal (steps 5210 through S230). To minimize deterioration in sound quality associated with a synchronization signal and a data signal included in an audio signal, the synchronization signal and the data signal may be inserted in a frequency-domain signal and thus, the transforming unit 210 may transform the received audio signal into a frequency-domain signal.

The receiver 220 may perform a correlation operation to detect the synchronization signal from among the synchronization signal and the data signal included in the frequency-domain signal that is obtained through the transform (steps S240 and S250). Desirably, the first detecting unit 220 may perform MCLT on each sample frame of the audio signal, may perform a correlation operation so as to generate a correlation value, and may determine a synchronization location based on the location of a peak of the correlation value. As another example, the first detecting unit 220 may perform MCLT on sample frames each of which has predetermined interval from adjacent ones, may perform a correlation operation so as to generate a correlation value, and may determine a synchronization location based on the location of a peak of the correlation value.

The receiver 200 may detect the data signal based on the location of the detected synchronization signal (steps S260 and S270). Desirably, the second detecting unit 230 may detect the data signal inserted into a frequency domain, in the same manner as the method of detecting the synchronization signal. In this example, a value of the data signal may be determined based on a phase of the audio signal. However, the data signal detected by the second detecting unit 230 may not be directly utilized for determining a bit of data since the phase of the data signal varies based on the ambient environment.

The receiver 200 may represent the data signal in complex plane, may form clusters of data signal values of data signals within a predetermined range, and may determine a bit associated with the data signal based on a cluster (steps S280 through S310). Desirably, the bit determining unit 240 may obtain an initial bit value from a pilot signal, and may perform calculation associated with a phase delay of the data signal based on the initial bit value, as illustrated in FIG. 3. In this example, the pilot signal may be inserted along with the synchronization signal, and may be configured in a predetermined bit order based on a pilot data insertion rule and thus, a phase delay may be identified by referencing the pilot signal, in particularly and by comparing a transmitted pilot signal and a received pilot signal. Also, the bit determining unit 240 may perform mapping of the data signal extracted from the audio signal, based on a mapping reference value generated as a result of the calculation associated with the phase delay. However, this process relates to forming a cluster range based on a data concentration, not to determining a bit of data. Also, the bit determining unit 240 may perform mapping of the provided data signal based on the mapping reference value. Accordingly, the bit determining unit 240 may update the mapping reference value by reflecting a result of mapping of the data signal, and may readjust the cluster range formed of mapped data based on a data concentration by reflecting the result of mapping associated with the data signal.

The extracting unit 250 may extract data from the data signal (step S320).

As described in the foregoing, a data reception error reduction system in acoustic communication in audible frequency range may apply a bit determining appropriate for the acoustic communication when a receiver extracts a data signal from an audio signal and thus, may reduce a data reception error in the receiver even in an environment where a sound signal is noisy and is significantly affected by a change in the ambient environment and increase reliability of data transmission, while the acoustic communication is performed in the audio frequency band through modification of an audio signal or adding of a predetermined signal to an audio signal.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Industrial Applicability

The present invention is to reduce a data reception error in a receiver by taking into consideration that a sound signal is noisy and is significantly affected by a change in the ambient environment when the acoustic communication is performed in the audio frequency band through modification of an audio signal or adding of a predetermined signal to an audio signal. Accordingly, the present invention has industrial applicability since it has a sufficiently high probability of being available on the market and can be substantially implemented.

The invention claimed is:

1. A system for reducing a data reception error in acoustic communication, comprising:
   a transmitter for acoustically transmitting audio signals, which contains synchronization signals and bit-wise data signals in frequency domain; and a receiver for receiving the audio signal transmitted acoustically, transforming thereof into frequency domain, detecting the synchronization signals and detecting the data signals with a reference to the position of the detected synchronization signals, and collectively determining the bits of the data signals based on clusters of the data signals formed in I-Q complex frequency domain.

2. A communication apparatus comprising:

a transforming unit configured to transform an audio signal into a frequency-domain signal based on a predetermined transform;

a first detecting unit configured to detect a synchronization signal included in the frequency-domain signal by correlation operation;

a second detecting unit configured to detect the data signal included in the frequency-domain signal based on the location of the synchronization signal;

a bit determining unit configured to determine a bit of the data signal based on whether the data signal form clusters within a predetermined range in complex plane; and an extracting unit configured to extract data associated with the data signal according to the bit of the data signal.

3. The apparatus as claimed in claim 2, wherein the first detecting unit performs MCLT on each sample frame of the audio signal, performs the correlation operation so as to generate a correlation value, and determines a location of the synchronization signal based on the location of a peak of the correlation value.

4. The apparatus as claimed in claim 2, wherein the first detecting unit performs MCLT on sample frames of the audio signal which have predetermined interval from each other, performs the correlation operation so as to generate a correlation value, and determines a location of the synchronization signal based on the location of a peak of the correlation value.

5. The apparatus as claimed in claim 2, wherein the bit determining unit obtains an initial bit value from a pilot signal, and identify a phase delay of the data signal so as to generate a mapping reference value.

6. The apparatus as claimed in claim 5, wherein the bit determining unit performs mapping the data signal with the mapping reference value.

7. The apparatus as claimed in claim 5, wherein the bit determining unit reflects a result of mapping the data signal on the mapping reference value so as to update the mapping reference value.

8. The apparatus as claimed in claim 5, wherein the bit determining unit adjusts a range of the clusters using a result of mapping the data signal.

9. A communication method comprising:

transforming an audio signal into a frequency-domain signal based on a predetermined transform ;

performing a correlation operation so as to detect a synchronization signal included in the frequency-domain signal;

detecting the data signal included in the frequency-domain signal based on the location of the synchronization signal;

determining a bit of the data signal based on whether the data signal form clusters within a predetermined range in complex plane; and extracting data associated with the data signal according to the bit of the data signal.

10. The method as claimed in claim 9, further comprising: obtaining an initial bit value from a pilot signal, and identifying a phase delay of the data signal so as to generate a mapping reference value.

11. The method as claimed in claim 10, further comprising: mapping the data signal to the complex plane based on the mapping reference value.

12. The method as claimed in claim 11, further comprising: updating the mapping reference value after mapping the data signal to the complex plane.

13. The method as claimed in claim 10, further comprising: adjusting a predetermined range according to a result of mapping the data signal.

* * * * *